United States Patent

[11] 3,611,049

| [72] | Inventor | Moo S. Yoon |
| | | Glenview, Ill. |
| [21] | Appl. No. | 50,424 |
| [22] | Filed | June 29, 1970 |
| [45] | Patented | Oct. 5, 1971 |
| [73] | Assignee | A. B. Dick Company |
| | | Niles, Ill. |

[54] AUTOMATIC POWER CONTROL CIRCUIT
5 Claims, 1 Drawing Fig.

[52] U.S. Cl. .................................................... 317/141 S,
  317/148.5 B, 307/252, 307/293
[51] Int. Cl. ...................................................... H01h 47/18,
  H01h 47/32
[50] Field of Search .......................................... 317/141 S,
  142 R, 148.5 B; 307/252, 293

[56] References Cited
UNITED STATES PATENTS

| 3,333,175 | 7/1967 | Klyce .......................... | 317/141 S |
| 3,436,607 | 4/1969 | Yagusic ....................... | 317/141 S |
| 3,512,048 | 5/1970 | Wallentowitz et al. ....... | 317/142 R |

*Primary Examiner*—Lee T. Hix
*Attorney*—McDougall, Hersh & Scott

ABSTRACT: This application discloses a power control circuit effective to maintain a power circuit energized for predetermined periods of time after the receipt of a signal pulse. The circuit includes a controllable semiconductor device controlling relay-operated contacts in the power circuit and signal storage means operable to maintain the device conducting and therefore the contacts closed while the signals are supplied and for a predetermined period of time after the last signal is received.

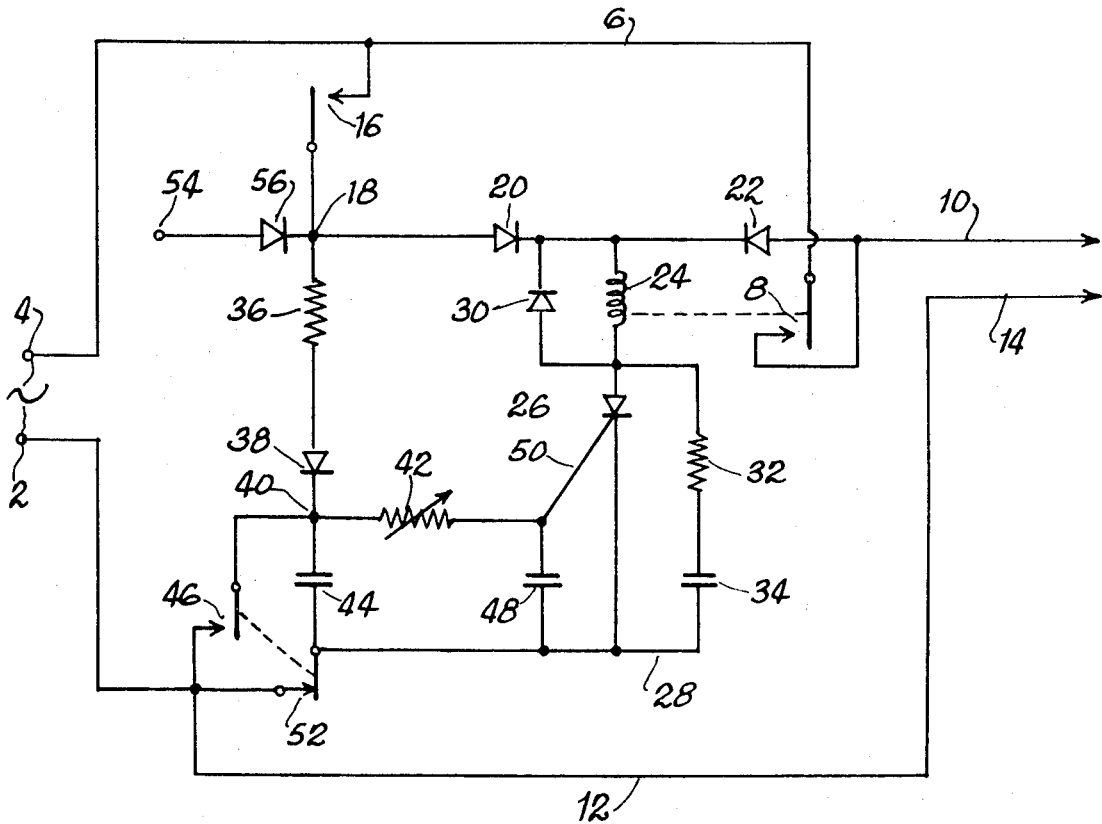

AUTOMATIC POWER CONTROL CIRCUIT

BACKGROUND OF THE INVENTION

This invention relates generally to apparatus for controlling the flow of electric power. More specifically, it relates to control circuit for controlling electric power in response to repetitive input signals.

In many types of devices powered by electrical energy in industrial and commercial use, a repetitive operation is performed. Very frequently, the repetitive operation is performed only at spaced time intervals in the course of the working period so that the apparatus is therefore in a standby state. The electric power in such apparatus is supplied for a wide variety of purposes such as the operation of motors, lights, the energization of electrical circuits and the like. If the electric power is supplied while the apparatus is in the standby state, there is an unnecessary consumption of power. Perhaps, more significantly the electrical current flow through the various elements and circuits generates heat. The heat generated may require larger elements and circuit components in order to absorb and dissipate the heat and not be damaged thereby. Such components may be larger than otherwise is necessary for the actual performance of the functions of the apparatus. The continuous flow of current and consequent heat may require the addition of cooling means such as blowers or air coolers which in many situations will discharge the heated air into a closed environment rendering it uncomfortable for users.

A particular kind of apparatus wherein a circuit in accordance with this invention has utility is a copy duplicator used in offices and other commercial and industrial establishments. In a typical situation, such a machine is turned on at the beginning of a work period and at various times during the period one or more copies of documents will be made. A significant number of elements in such a device do not require any "warm up" and therefore do not need to be supplied with continuous electric power. Were they continuously supplied with power they would be consuming it unnecessarily and would generate heat requiring them to be larger than is otherwise necessary and such heat would have to be dissipated.

A copy duplicator like many other devices includes various elements which are operated while the device is in actual use but which do not operate when it is in the standby state. Thus, such devices may include copy paper feeders and cutoff knives, exposure lamps, lens, shutters and the like which are operated each time a copy is made. By providing a source of electrical energy through a circuit including contacts to be closed each time one of these elements is operated when a copy is made an electrical signal can be derived indicating that the device is in use and power should continue to be supplied.

It is an object of this invention to provide a power control circuit responsive to electrical signals indicating that an electrical powered apparatus is in use to maintain current flow in the circuit during the period of use and for a predetermined period thereafter which circuit is reliable and relatively economical to construct.

SUMMARY OF THE INVENTION

The foregoing and other objects are achieved in one embodiment by the provision of a controllable semiconductor-rectifying device operating a relay having contacts in a power supply circuit. A signal storage device receiving signals indicating operation of apparatus supplied by the circuit maintains the rectifier in a conducting state while said signals are received and for adjustable predetermined intervals of time thereafter.

BRIEF DESCRIPTION OF THE DRAWING

The invention itself is defined in the claims appended hereto and forming a part of this application, while an understanding of the structure and mode of operation of an embodiment thereof, may be derived from the following detailed description taken in conjunction with the drawing in which the sole FIG. is a schematic diagram of a circuit embodying the invention.

DETAILED DESCRIPTION

One embodiment of the invention comprises a pair of input terminals 2 and 4 to which may be connected a source of alternating current supply for use by apparatus into which this circuit may be incorporated. A conductor 6 connects the terminal 4 through a pair or relay contacts 8 to a power output terminal 10. Another power output terminal 14 is connected to the power input terminal 2 through a conductor 12.

Connected to the conductor 6 are a pair of normally open contacts 16 leading to a junction point 18. A diode 20 has its anode connected to the junction 18 and its cathode to the cathode of a diode 22, the anode of which is connected to the power output terminal 10. Connected to the junction of the diodes 20 and 22 is the operating coil 24 of the relay including the contacts 8. A silicon-controlled rectifier, SCR, 26 has its anode connected to the other end of the operating coil 24 while its cathode is connected to a bus 28. Connected in shunt with the operating coil 24 is a diode 30 having its cathode connected to the junction of the diodes 20 and 22 to function as a "free wheeling" diode to dissipate current flow due to the inductive nature of the coil 24. A resistor 32 in series with a capacitor 34 shunts the SCR 26.

A resistor 36 is connected at one end to the junction 18 and at its opposite end to the anode of a diode 38. The cathode of the diode 38 is connected to a junction 40 to which is also connected an adjustable resistor 42 as well as a capacitor 44 and the normally open contacts of a switch 46. A capacitor 48 is connected to the opposite end of the resistor 42 while the junction of the capacitor 48 is connected via a conductor 50 to the gate electrode of the SCR 26.

Mechanically connected to the movable contact of the normally open switch 46 is the movable contact of a normally closed switch 52 connecting the bus 28 to the terminal 2.

A signal input terminal 54, adapted to receive electrical signals indicating that the apparatus is being operated repetitively, is connected to the junction 18 through a diode 56. If the apparatus incorporating the invention is a copy duplicator having one or more elements which are operated each time a copy is made, the signal applied to the terminal 54 may be derived from any one of such elements. For instance, a paper-cutting knife for severing copy paper from a roll of such paper may operate contacts supplying the signal to the terminal 54. Alternatively, in such an apparatus, the circuit energizing an exposure lamp may produce such a signal by providing appropriate contacts therein.

Assuming therefore that a repetitive operating signal may be derived from any convenient and suitable source, the operation of the circuit embodying the invention is as follows: When it is desired to operate the apparatus, the switch 16 is momentarily closed by an operator. Upon the closure of the switch 16, the capacitor 44 is charged through the resistor 36 and diode 38. At the same time the capacitor 48 is charged through the same components as well as the adjustable resistor 42. The component values are selected to insure that the capacitors 44 and 48 are charged to values exceeding the voltage level necessary to trigger the SCr 26. Upon the application of the necessary to trigger voltage to the SCR, it conducts energizing the operating coil 24 by virtue of circuit existing through momentarily closed contacts 16 and diode 20. Upon the energization of the operating coil 24, the contacts 8 are closed completing a circuit from the terminal 4 through the conductor 6 and the now-closed contacts 8 to the terminal 10. The return circuit is completed from the terminal 14 through the conductor 12 to the terminal 2 so that power is now supplied to the level whatever it may be. The closed contacts 8 not only complete the power supply circuit but also complete a relay-holding circuit through diode 22 for the operating coil 24. Inasmuch as the SCR is a unilateral conducting device and the voltage supplied to it through the diode 22 and coil 24 is unidirectional, the resistor 32 and capacitor 34 is a protective circuit to reduce a sudden change of voltage for the SCR 26.

After the momentary closure of the contact 16, if an operating signal pulse is supplied to the terminal 54, it too will tend to charge up or maintain the charge on the capacitors 44 and 48 thus maintaining the SCR 26 conductive. If no operating signal pulse is applied, the capacitor 44 will discharge through the resistor 42 and capacitor 48. The capacitor 44 is selected to have a higher value of capacitance than the capacitor 48 so that it will continue to maintain the SCR 26 conducting until it has discharged below the value of a triggering voltage of the SCR. In this manner, the SCR will be maintained on for a predetermined time interval after the receipt of each operating pulse at the terminal 54. That time interval is determined by the time constant of the circuit including the capacitor 44, adjustable resistor 42 and capacitor 48. By changing the resistance value of the resistor 42 that time interval may be varied.

If there should be a need for emergency shutdown of power, the switches 52 and 46 may be operated together to close the switch 46 and open the switch 52. The closure of the switch 46 discharges the capacitors 44 and 48 rapidly, and the opening of the switch 52 opens the circuit to the coil 24, deenergizing the coil 24. The deenergization of the coil 24 opens the contacts 8 so as to interrupt the power supply.

The circuit whose structure and operation is thus described is one which may use relatively small components thus permitting its construction in a relatively economic manner. Nevertheless, it is still a reliable circuit utilizing solid-state components with relatively few moving parts and is able to control significant amounts of power.

Various changes and modifications may be made in the embodiment illustrated while still within the scope of the invention, and it is therefore intended by the claims to cover all such changes and modifications which fall within their scope.

What is claimed as new and desired to be secured by Letters Patent of the United States is:

1. An electric power control circuit comprising: a pair of power input terminal; a first power output terminal; first conductive means including a pair of relay contacts interconnecting one of said power input terminals with said first power output terminal; a second power output terminal; second conductive means interconnecting the other of said power input terminals with said second power output terminal; a relay coil for operating said relay contacts; means connected to said first conductive means for supplying operating current to said relay coil; a semiconductor controllable switching device connected in series with said relay coil and to said second conductive means; a signal storage circuit comprising a first capacitor connected at one end to said other power input terminal; an adjustable resistor connected to the other end of said first capacitor, and a second capacitor connected at one end to said other power input terminal and at its other end to said adjustable resistor; means connecting the junction of said adjustable resistor and said second capacitor to the control element of said semiconductor controllable switching device; and means connected to the junction of said first capacitor and said adjustable resistor whereby a signal may be supplied to said junction to charge said first and second capacitors to values of voltage in excess of that necessary to cause conduction of said switching device so that when said device conducts current will flow in said relay coil to cause said relay contacts to close and supply power to said power output terminals as long as the voltage stored in said signal storage circuit exceeds the value necessary to cause conduction of said switching device.

2. The electric power control circuit of claim 1 wherein said means connected to the junction of said first capacitor and said adjustable resistor includes a signal input terminal adapted to receive repetitive signals indicating the operation of a device and said signals are stored in said signal storage circuit.

3. The electrical power control circuit of claim 2 wherein means connect the junction of said first capacitor and said adjustable resistor to said first conductive means and said means include a pair of normally opened switch contacts effective upon closure to charge said signal storage circuit to the voltage value in excess of that necessary to cause conduction of said switching device.

4. The electric power control circuit of claim 1 wherein said means connecting said relay coil to said first conductive means includes said relay contacts whereby when said relay coil is energized and said relay contacts are closed a holding circuit for said relay is completed.

5. The electric power control circuit of claim 1 further including normally closed switch contacts connected between said signal storage circuit and said other power input terminal and normally opened switch contacts connected between the junction of said first capacitor and said adjustable resistor and said other power input terminal; and means interconnecting said switch contacts whereby when they are operated said first and second capacitors will discharge and said switching device will cease conducting to cause said relay coil to be deenergized and said relay contacts to open.

UNITED STATES PATENT OFFICE
CERTIFICATE OF CORRECTION

Patent No. 3,611,049          Dated October 5, 1971

Inventor(s) Moo S. Yoon

It is certified that error appears in the above-identified patent and that said Letters Patent are hereby corrected as shown below:

Column 1, line 13, after "apparatus" insert --is not in use outside of those intervals and the apparatus--;

Column 2, line 30, after "48" insert --and resistor 42--.

Signed and sealed this 9th day of May 1972.

(SEAL)
Attest:

EDWARD M. FLETCHER, JR.          ROBERT GOTTSCHALK
Attesting Officer                Commissioner of Patents